Sept. 26, 1961     E. L. CARL     3,001,301
EDUCATIONAL DEVICE FOR TEACHING ARITHMETIC
Filed Aug. 3, 1960     2 Sheets-Sheet 1
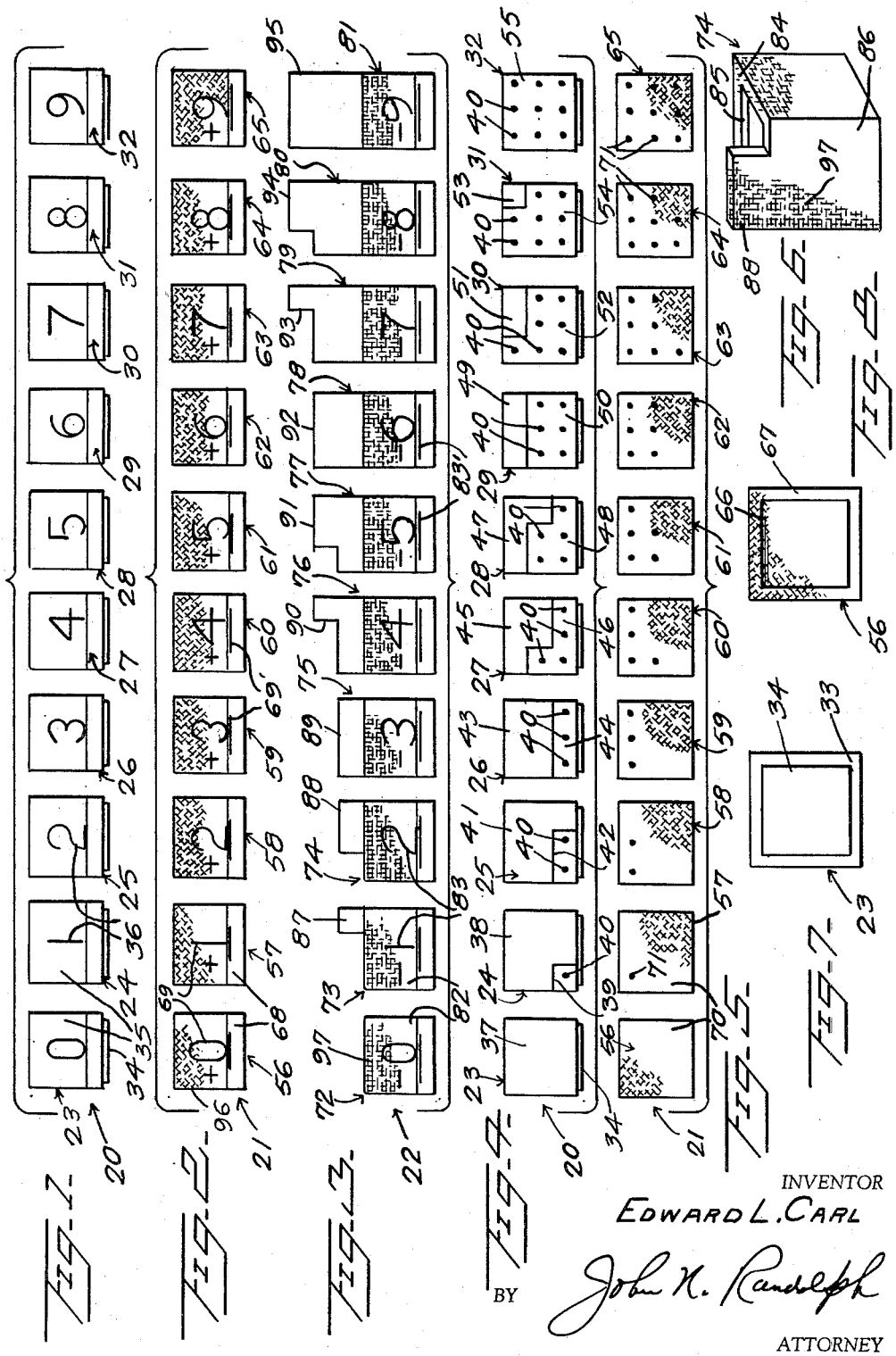
INVENTOR
EDWARD L. CARL
BY John N. Randolph
ATTORNEY Sept. 26, 1961 E. L. CARL 3,001,301
EDUCATIONAL DEVICE FOR TEACHING ARITHMETIC
Filed Aug. 3, 1960 2 Sheets-Sheet 2
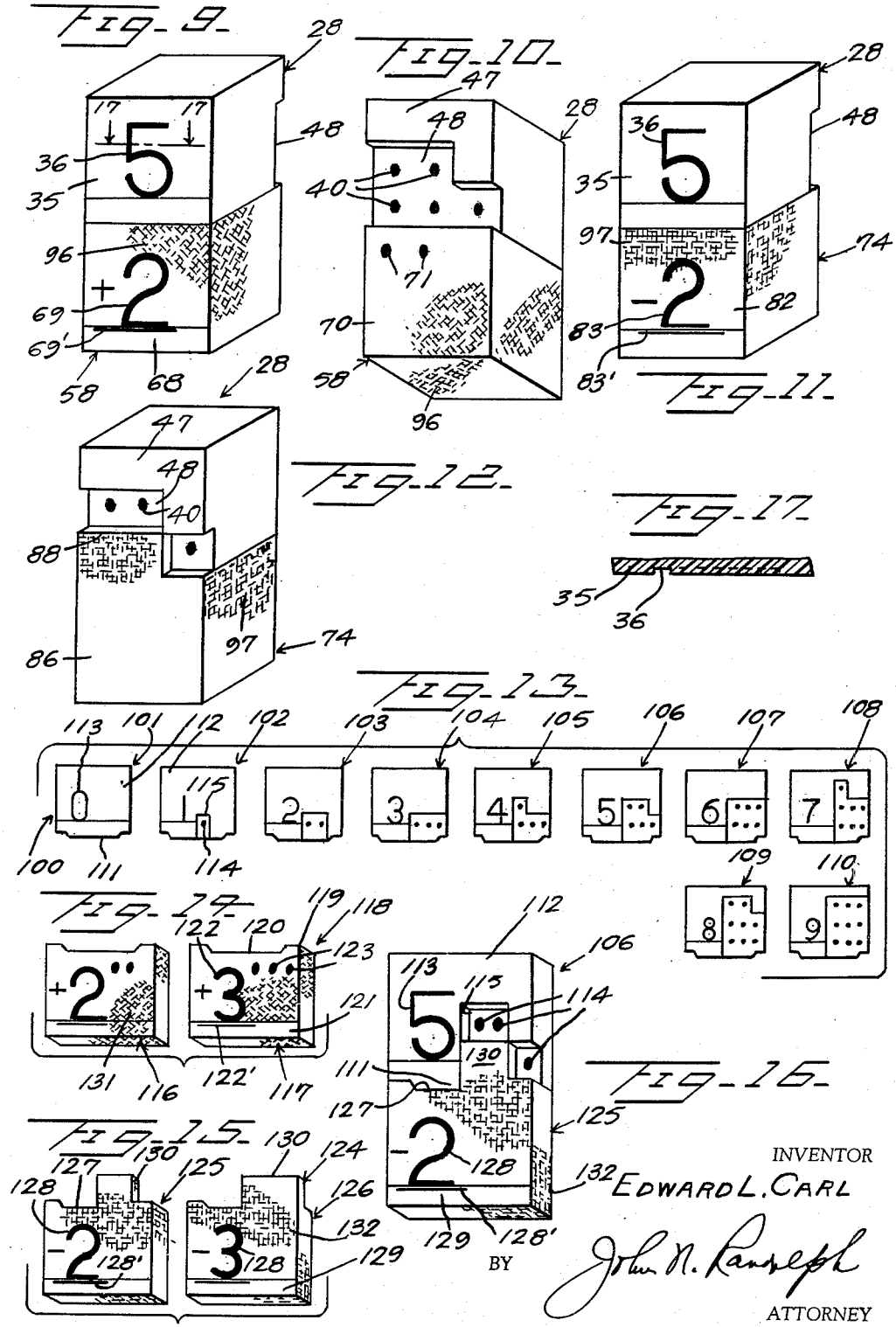
INVENTOR
EDWARD L. CARL
BY John N. Randolph
ATTORNEY

United States Patent Office 3,001,301
Patented Sept. 26, 1961

3,001,301
EDUCATIONAL DEVICE FOR TEACHING
ARITHMETIC
Edward L. Carl, 2432 16th Ave., Vero Beach, Fla.
Filed Aug. 3, 1960, Ser. No. 47,276
9 Claims. (Cl. 35—31)

This invention relates to a novel educational device for use by young children in learning basic mathematical techniques and concepts, specifically in the learning of simple addition and subtraction.

More particularly, it is an object of the invention to provide an educational device consisting of a plurality of objects forming three sets and wherein any one of the objects of a first set can be combined with any object of a second set to form a simple problem in addition or with any object of a third set to form a simple problem in subtraction.

Still a further object of the invention is to provide such a device wherein the answer to the addition or subtraction problem is also provided by the two objects employed to enable the child to verify his or her answer.

Various other objects and advantages of the invention will hereinafter become more fully apparent from the following description of the drawings illustrating presently preferred embodiments thereof, and wherein:

FIGURE 1 is a front elevational view of all of the objects of a first set;

FIGURE 2 is a similar view of all of the objects of a second set;

FIGURE 3 is a similar view of all of the objects of a third set;

FIGURE 4 is a rear elevational view of the first set of objects;

FIGURE 5 is a rear elevational view of the objects of the second set;

FIGURE 6 is an enlarged rear perspective view of one of the objects of the third set;

FIGURE 7 is a bottom plan view of any one of the objects as shown in FIGURES 1 and 4;

FIGURE 8 is a top plan view of any one of the objects shown in FIGURES 2 and 5;

FIGURE 9 is a front perspective view showing one of the objects of FIGURE 1 combined with one of the objects of FIGURE 2;

FIGURE 10 is a rear perspective view of the two objects as shown in FIGURE 9;

FIGURE 11 is a front perspective view showing one of the objects of FIGURE 1 combined with one of the objects of FIGURE 3;

FIGURE 12 is a rear perspective view of the two combined objects as shown in FIGURE 11;

FIGURE 13 is a front elevational view of a modified first set of objects;

FIGURE 14 is an enlarged front perspective view of two objects of the modified second set of objects;

FIGURE 15 is an enlarged front perspective view of two objects of the modified third set of objects;

FIGURE 16 is an enlarged front perspective view showing one object of the modified first set combined with one object of the modified third set, and FIGURE 17 is a fragmentary horizontal sectional view, on an enlarged scale, taken substantially along a plane as indicated by the line 17—17 of FIGURE 9.

Referring more specifically to the drawings and first with reference to the educational device as illustrated in FIGURES 1 to 12 and 17, said educational device includes three sets of objects, designated generally 20, 21 and 22. Each of said sets is composed of ten objects. The set 20 consists of the objects 23, 24, 25, 26, 27, 28, 29, 30, 31 and 32. Each of said objects is in the form of a block or large cube having a bottom face 33, as seen in FIGURE 7, provided with a noncircular projection 34. Each block of the set 20 has a flat front face 35 on which is inscribed a numeral 36. The front faces 35 of the blocks 23, 24, 25, 26, 27, 28, 29, 30, 31 and 32 bear the numerals "0," "1," "2," "3," "4," "5," "6," "7," "8" and "9," respectively, as clearly illustrated in FIGURE 1.

The rear faces of the blocks of the set 20 are shown in FIGURE 4. The rear face 37 of the block 23 provides a smooth uninterrupted surface containing no markings. The rear face 38 of the block 24 is recessed as seen at 39 in its lower left-hand corner and said recessed area contains a single dot or spot 40. The rear face 41 of the block 25 has a recessed area 42 extending two-thirds across the bottom one-third thereof and in which two spots 40 are provided. The rear face 43 of block 26 is recessed as seen at 44 completely across the bottom one-third thereof and contains three spots 40 in said recessed area. The rear face 45 of block 27 has a recessed area 46 extending completely across the bottom one-third thereof and additionally up two-thirds of the lef-hand portion of said rear face and in which four equally spaced spots 40 are provided. The rear face 47 of the block 28 is recessed as seen at 48 to include an additionally one ninth of said rear face and to provide an area to accommodate five equally spaced spots 40. The rear face 49 of the block 29 has the bottom two-thirds thereof recessed, as seen at 50, to receive six equally spaced spots 40. The rear face 51 of the block 30 is recessed as seen at 52 to provide an area including all but the upper right-hand two-ninths of said face 50, to accommodate seven equally spaced spots 40. The rear face 53 of the block 31 is recessed as seen at 54 except that the upper right-hand corner thereof to provide an area equal to eight-ninths of said rear face and containing eight equally spaced spots 40. The entire rear face 55 of the block 32 is recessed and contains nine equally spaced spots 40. It will thus be apparent that the number of spots on the rear faces of the blocks 24–32 correspond to the numerals 36 on the front faces 35 of said blocks.

The blocks 56, 57, 58, 59, 60, 61, 62, 63, 64 and 65 of the set 21 are each of the same size as the individual blocks of the set 20, except that the blocks of the set 21 are not provided with the projections 34. However, as illustrated in FIGURE 8, each of the blocks of the set 21 has a large noncircular opening or socket 66 in the flat top surface 67 thereof of a proper size and shape to conformably receive the projection 34 of any one of the blocks of the set 20.

The front faces 68 of the blocks 56, 57, 58, 59, 60, 61, 62, 63, 64 and 65 bear the inscriptions "+0," "+1," "+2," "+3," "+4," "+5," "+6," "+7," "+8" and "+9," respectively, designated 69, beneath each of which is a line 69'.

The rear faces or sides 70 of the blocks 56–65 are illustrated in FIGURE 5. None of the rear faces 70 are recessed and the rear face 70 of the block 56 is unmarked. The rear face 70 of the block 57 contains one spot 71 in its upper left-hand corner. The rear face of the block 58 contains two spots, the rear face of the block 59 has three spots, the rear face of the block 60 has four spots, the rear face of the block 61 five spots, the rear face of the block 62 six spots, the rear face of the block 63 seven spots, the rear face of the block 64 eight spots, and the rear face of the block 65 nine spots, all of which are designated 71. The spots are added from left to right and from top to bottom as clearly illustrated in FIGURE 5, and it will be apparent that the number of spots 71 on the backs 70 of the blocks 57 to 65 correspond with the numerals 69 on the front faces 68 of said blocks.

The set 22 likewise comprises ten blocks 72, 73, 74, 75, 76, 77, 78, 79, 80 and 81, which blocks have front faces 82 bearing inscriptions "—0", "—1", "—2", "—3", "—4", "—5", "—6", "—7", "—8", "—9", respectively, designated 83, beneath each of which is a line 83'. Each block of the set 22 has a flat top surface 84 provided with an opening 85, of the same size and shape as the opening 66, to selectively receive any one of the projections 34, and the top of the block 72 is identical with the top of the block 56, as seen in FIGURE 8. Each of the blocks of the set 22 has a smooth unmarked and unrecessed rear side 86 corresponding to the rear side of the block 74, as seen in FIGURE 6. However, the blocks 73 to 81 differ from one another in that each of said blocks includes a screen or shield forming an integral extension of the rear part thereof and which shields 87, 88, 89, 90, 91, 92, 93, 94 and 95 of the blocks 73 to 81, respectively, are each of progressively greater size. The shield or screen 95 is capable of covering nine times the area of the screen 87.

FIGURE 9 illustrates a combination of the blocks 28 and 58 to form a problem in addition, and wherein the projection 34 of the block 28 is inserted into the socket or opening 66 of the block 58 so as to position the front face 35 of block 28 directly above the front face 68 of block 58. Accordingly, the numeral "5" of the block 28 will appear above the legend "+2" of the block 58 which with the line 69' provides a problem in addition reading

"5"
+2

The answer decided upon can be checked by turning the two connected blocks 28 and 58 through an arc of 180° for viewing the rear sides 47 and 70 of said blocks 28 and 58, respectively, as seen in FIGURE 10. By then counting the spots 40 and 71 which are visible on said sides 47 and 70 the total of seven spots will correspond to the correct answer presented by the indicia 36 and 69 on the front faces of the blocks 28 and 58. It will likewise be obvious that any of the blocks of the set 20 may be combined with any of the blocks of the set 21 in the aforementioned manner to provide a problem in addition and the solution of the problem.

Similarly, any one of the blocks of the set 20 can be combined with any one of the blocks of the set 22, the numeral of which block of the set 22 is not larger than the numeral of the block of the set 20, to provide a problem in subtraction and the solution of said problem. Such a problem is presented in FIGURE 11 wherein the block 28 is shown mounted on the block 74 and interlocked therewith by the projection 34 engaging the opening or socket 85 so that the front face 35 of the block 28 will be disposed directly above the front face 82 of the block 74 and with the inscription "—2", underlined, as seen at 83', of the block 74, disposed beneath the numeral "5" of the block 28. The blocks 28 and 74 may then be rotated 180° for exposing the rear sides thereof, as seen in FIGURE 12. It will be noted that the screen 88 of the block 74 will then fit a part of the recess 48 to cover the bottom center and bottom left-hand spots 40 of the block 28 leaving three spots 40 exposed, representing the correct solution of the problem presented in FIGURE 11. The screens 87 to 95 are arranged to obscure the spots 40 progressively in the same order that the spots are added, as illustrated in FIGURE 4, from left to right commencing with the block 24. It will be apparent that the shield 91, for example, will fit snugly in the recess 48 and will not fit recesses 40, 42, 44 or 46. Thus, blocks of the set 22 can only be combined with blocks of the set 20 whose numerals 36 are as large or larger than the numerals 83 of the blocks of the set 22, in order that no improper subtraction problem can be created.

FIGURE 17 is a sectional view through a portion of the front face 35 of the block 28 showing that the numeral 36 thereof is formed as a groove in said face 35, with the bed of the groove preferably being painted black. The numerals 36 of the other blocks of the set 20 are formed in the same manner and this is likewise true of the indicia 69 and 83 and the spots 40 and 71. All of the blocks of the set 20 are preferably white to contrast with the black numerals 36 and black spots 40. All of the blocks of the set 21 are preferably orange, as indicated at 96, and the blocks of the set 22 are preferably yellow, as indicated at 97. However, other colors may be utilized which will contrast with one another and with the white or uncolored blocks of the set 20, and which will likewise contrast with the indicia and spots on said blocks. The blocks of all three sets 20, 21 and 22 are preferably hollow and preferably formed of plastic.

FIGURES 13 to 16 illustrate a slightly modified form of the educational device wherein the objects of the three sets are plaques rather than blocks. The first set 100, which replaces the set 20, is composed of ten plaques 101, 102, 103, 104, 105, 106, 107, 108, 109 and 110. Each of said plaques has a bottom projection 111. Front faces of said plaques, designated 112, have numerals inscribed thereon, designated 113 from "0" to "9" consecutively commencing with the plaque 101, and which numerals 113 are located in the left-hand portion of the face 112. The right-hand portion of the faces 112 of the plaques, commencing with the plaque 102, are provided with spots 114. The number of spots on each of said plaques corresponding to the number represented by the numeral 113 of said plaque. The spots 114 are located in recesses 115 in the right-hand side of the faces 112 and the size of said recesses is proportionally increased in ratio to the number of spots accommodated therein, in the same manner as the rear faces of the blocks 24 to 32 of the set 20, as seen in FIGURE 4.

Two plaques 116 and 117 of a second set 118 are illustrated in FIGURE 14, which set 118 also comprises ten plaques and replaces the set of blocks 21. Each of the plaques of the set 118 has a top edge 119 provided with a notch 120 of a proper size and shape to conformably receive a projection 111, so that any one of the plaques of the set 100 can be detachably interlocked with any one of the plaques of the set 118. The ten plaques of the set 118 have front faces 121 the left-hand portions of which bear a legend 122 consisting of a numeral preceded by "+", consecutively from "+0" to "+9", each underlined, as indicated at 122'. The plaques of the set 118, commencing consecutively with the plaque containing the legend "+1" additionally has spots 123 in the right-hand side of its face 121, the number of spots 123 corresponding to the numeral 122 of said plaque. For example, the plaque 117 bearing the inscription "+3" is provided with three spots 123.

Two of the third set of plaques, designated 124, which replace the blocks of the set 22, are illustrated in FIGURE 15, said plaques 125 and 126 being of the same thickness as the plaques of the set 100 and 118, and each being provided in its upper edge with a notch 127 to receive a projection 111 so that certain of the plaques of the set 100 can be interlocked with certain of the plaques of the set 124. The plaques 125 and 126 bear legends 128 on the front faces 129 thereof which differ from the legends 122 in that the numeral is preceded by "—", thus the plaque 125 bears the legend "—2" and the plaque 126 the legend "—3", and each of which legends is underlined, as indicated at 128'. The plaques of the set 124 have upwardly extending shields, with the exception of the plaque, not shown, having the legend "—0". The size of the shields increase progressively in the same manner as the size of the recesses 115 of the plaques of the set 100. Thus, the shield or screen 130 of the plaque 125 is of a proper size and correctly located to fill the recess 115 of the plaque 103 and the shield 130 of the plaque 126 is similarly capable of filling the recess 115 of the plaque 104. This relationship of the shields 130 to the recesses 115 corresponds with the relationship of the shields of the blocks 73 to 81 to the recesses of the blocks 24 to 32 and a further illustration and description thereof is accordingly considered unnecessary.

FIGURE 16 shows the plaque 106 interlocked with the plaque 125 to provide a problem in subtraction and the solution thereof, in the same manner as previously described and as illustrated in FIGURES 11 and 12, except that the plaques 106 and 125 do not have to be reversed to obtain the correct solution. However, it will be understood that the recessed areas 115 having the spots 114 can be located on the opposite sides of the plaques of the set 100 and this could likewise apply to the spots 123 of the set 118 and the shields 130 of the set 124.

The indicia and spots on the plaques of the sets 100, 118 and 124 are preferably painted and grooved, as previously described and as illustrated in FIGURE 17. Likewise, the plaques of the set 118 are preferably orange in color, as indicated at 131, and the plaques of the set 124 are preferably yellow, as seen at 132, to distinguish from one another and from the uncolored plaques of the set 100, all of which plaques are preferably formed of plastic.

Various other modifications and changes are contemplated and may obviously be resorted to, without departing from the function or scope of the invention as hereinafter defined by the appended claims.

I claim as my invention:

1. An educational device comprising three sets of objects each including a corresponding number of objects, means carried by each of the objects for detachably interfitting any one of the objects of a first set of said objects with any one of the objects of a second set and a third set of said objects, each of the objects of said first set containing a numerical indicia, certain of the objects of said first set containing spots representing the numerical indicia of said objects, each of the objects of the second set including numerical indicia to provide a problem in addition when combined with any one of the objects of the first set, certain of said objects of the second set having an area provided with spots cooperating with the spots of the object of the first set to provide a solution to the addition problem, each of the objects of said third set including indicia to provide a problem in subtraction when associated with an object of the first set, and all but one of the objects of said third set having an extension forming a screen for covering all or a portion of the spotted area of the object of the first set with which the third set object is combined and whereby the unobscured spotted area will disclose the solution of the problem in subtraction.

2. A visual arithmetic teaching aid comprising three sets of objects, means carried by said objects for detachably interconnecting any one of the objects of a first one of said sets to any one of the objects of a second one of the sets or certain objects of a third one of said sets, said objects of said first set and second set having indicia forming a problem in addition when any one of the objects of the first set is combined with any one of the objects of the second set and other portions constituting a visual solution of the addition problem, said objects of the third set having indicia combining with the indicia of the objects of the first set, when an object of the first set and an object of the third set are combined, to form a problem in subtraction, and said objects of the third set having additional means coacting with said other portions of the objects of the first set to afford the correct solution by observation of the subtraction problem.

3. An educational device as in claim 2, said objects each comprising a block, said other portions of the blocks of the first and second sets being disposed on sides of said blocks located opposite to sides thereof containing said indicia, and said means of the blocks of the third set comprising screens for obscuring parts of said other portions of the blocks of the first set.

4. An educational device as in claim 3, said other portions of the blocks of the first set comprising recessed areas containing spots in which certain of said screens of the third set objects are received.

5. An educational device as in claim 2, said objects of each of the sets comprising plaques.

6. An educational device as in claim 5, said other portions of the plaques of said first set comprising recessed areas containing spots for receiving said screens of the plaques of the third set when certain of the plaques of the first set are interconnected with certain of the plaques of said third set.

7. An educational device as in claim 6, said other portions of the plaques of the second set including areas containing spots and located whereby said areas are disposed contiguous with the recessed areas of the plaques of the first set when a plaque of the first set is interconnected with a plaque of the second set.

8. An educational device as in claim 2, said other portions of the objects of the first set comprising recessed areas containing spots, the size of said recessed areas and the number of spots contained therein varying in ratio to the numerical value of the indicia of said objects, and said means of the objects of the third set comprising screens for engaging in said recessed areas to obscure the spots thereof, the size of said screens of the third set objects varying in ratio to the numerical value of the indicia of said objects and in proportion to said recessed areas such that the screen of a third set object will not fit the recessed area of any first set object the numerical value of the indicia of which first set object is less than the numerical value of the indicia of said third set object.

9. An educational device as in claim 2, said indicia and said other portions of the objects defining grooves in surfaces of said objects whereby the values of said indicia and other portions may be determined by either sight or touch.

References Cited in the file of this patent
UNITED STATES PATENTS

| | | |
|---|---|---|
| 1,836,851 | Kidd | Dec. 15, 1931 |
| 2,950,542 | Steelman | Aug. 30, 1960 |